March 11, 1930.  W. BOER  1,750,382
PROPELLING DEVICE
Filed Dec. 27, 1928   3 Sheets-Sheet 1

WITNESSES
H. T. Walker
Chris Peinle

INVENTOR
Westinus Boer,
BY
ATTORNEY

March 11, 1930.  W. BOER  1,750,382
PROPELLING DEVICE
Filed Dec. 27, 1928    3 Sheets-Sheet 2
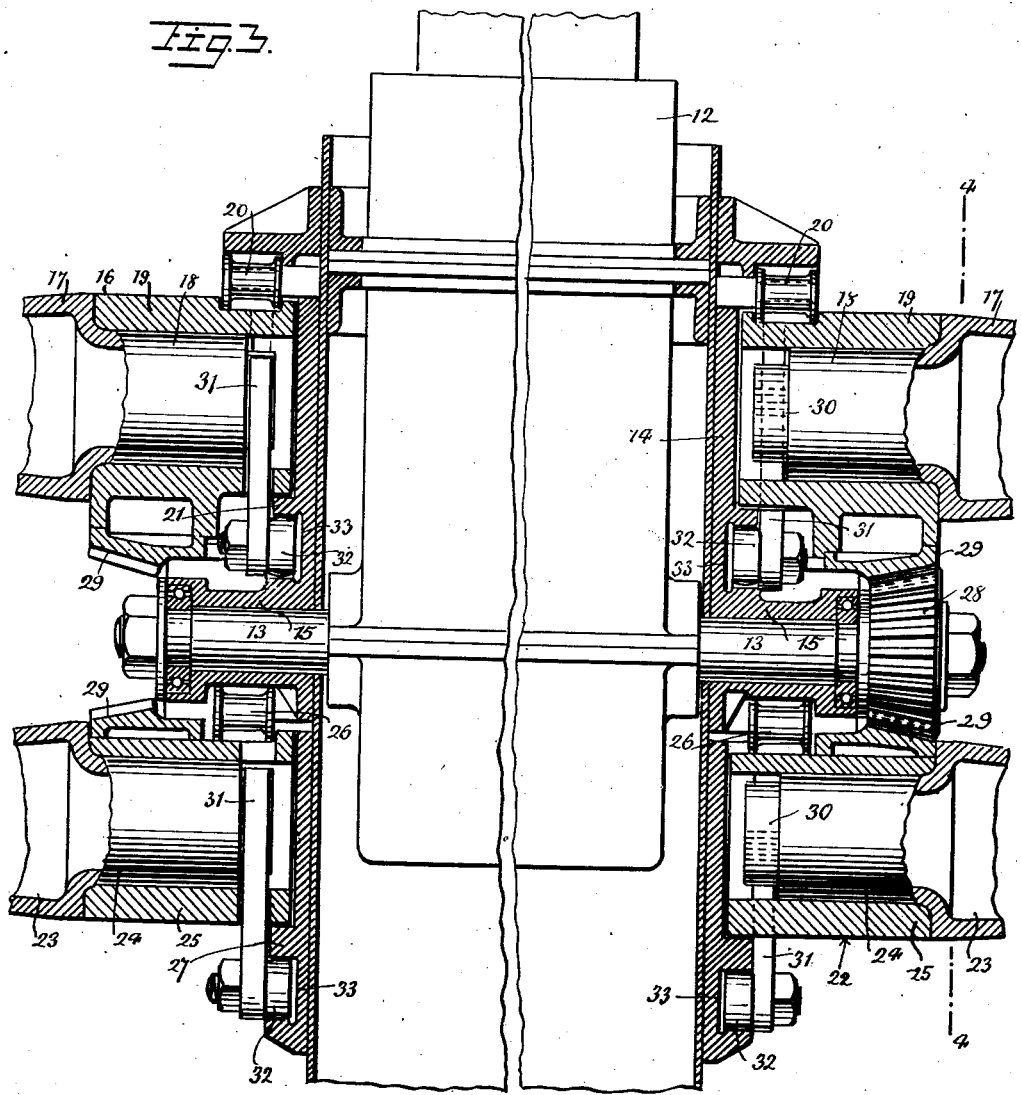
WITNESSES
H. T. Walker
Chris Feinle
INVENTOR
Westinus Boer
BY
ATTORNEY

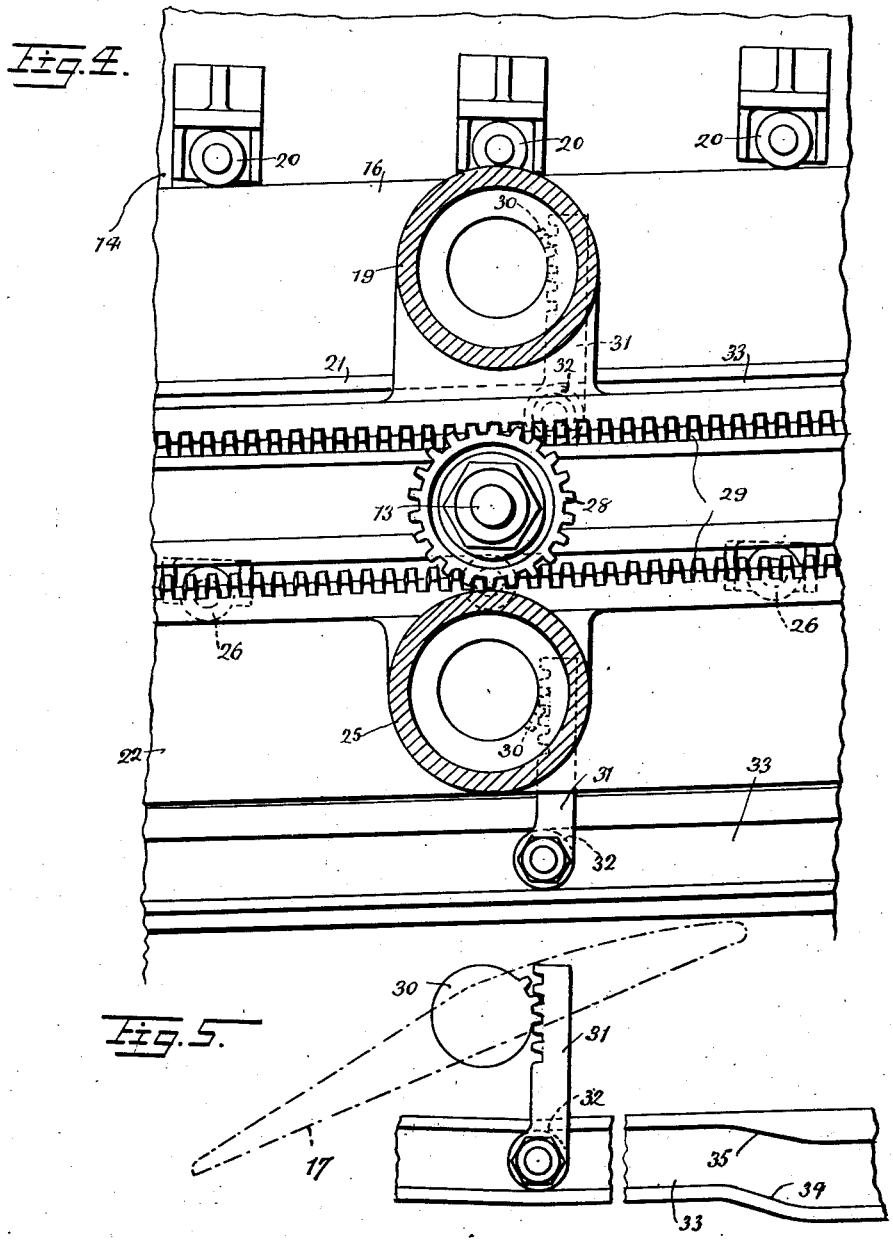

Patented Mar. 11, 1930

1,750,382

UNITED STATES PATENT OFFICE

WESTINUS BOER, OF GROTON, CONNECTICUT

PROPELLING DEVICE

Application filed December 27, 1928. Serial No. 328,738.

This invention relates to an improvement in air and water craft.

One of the objects of the invention is the provision in a craft of the indicated character of improved means whereby a more effectual dynamic reaction and corresponding increased propulsive force is obtained.

Another object of the invention is the provision in an aircraft of an improved propelling device whereby greater propulsive force may be obtained, and whereby it will be possible to make quicker take-offs and shorter landings at much steeper angles, and whereby a gyroscopic action is generated to keep the craft steady while in flight and while taking off and while landing.

Another object of the invention is the provision of an improved device adapted for the simultaneous suspension and propulsion of a body either in the air or water.

The nature of the invention and its distinguishing features and advantages will appear when the following specification is read in connection with the accompanying drawing, in which Fig. 1 is a plan view of the device of the present invention applied to an aircraft by way of example.

Fig. 3 is a fragmentary vertical sectional view through the device.

Fig. 4 is a sectional view taken on the line 4—4, of Fig. 3.

Fig. 5 is a view illustrating the manner in which each wing is rotated on its own axis.

Figure 1:
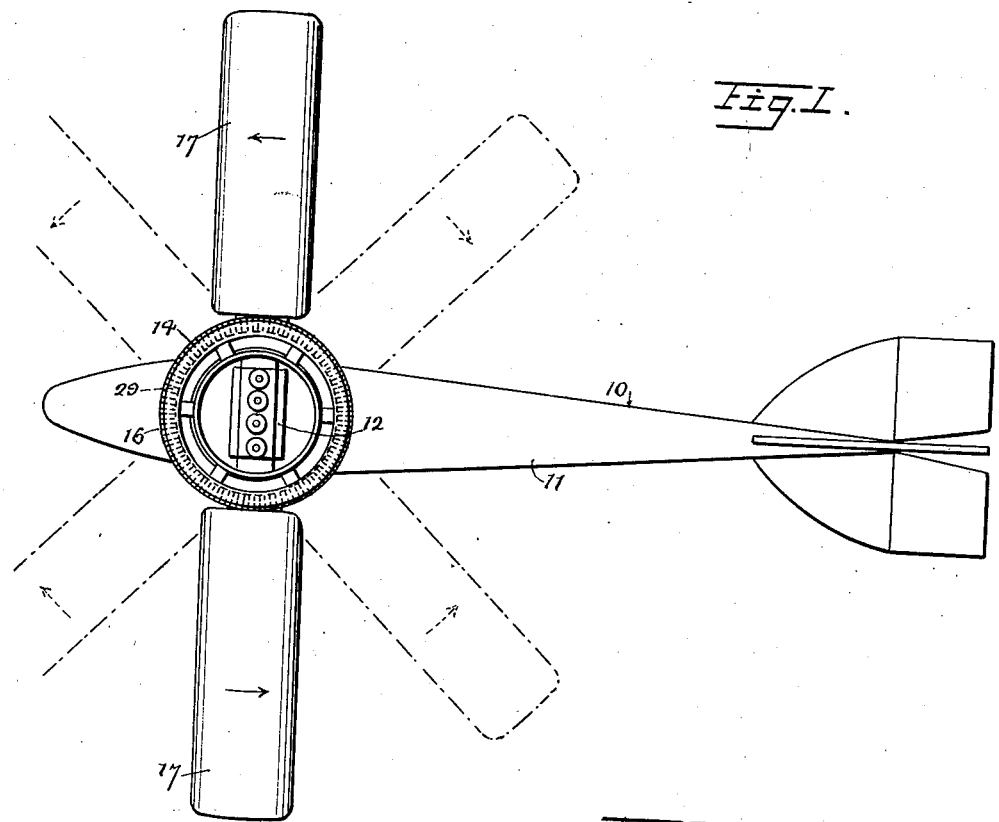
Figure 2:
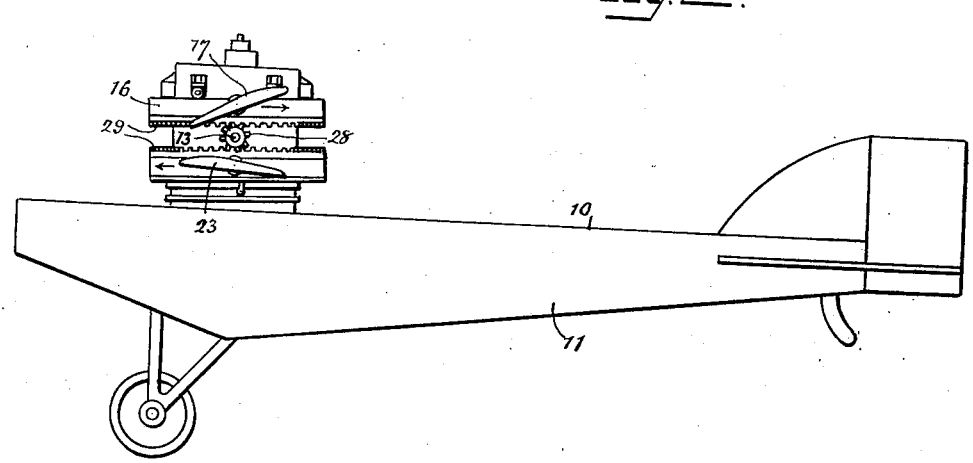
Fig. 2 is a side elevation of the craft shown in Fig. 1.

It is to be understood that the device of the present invention is applicable to air and water craft, and in the present instance, by way of example, the device is shown applied to an aircraft.

The aircraft or heavier than air type of airplane is conventionally illustrated and designated 10 having a body 11. Arranged on the body 11 is a suitable power plant including an engine conventionally illustrated and designated 12, and said engine may be of any preferred type to be driven electrically, or by compressed air, or may be of the internal combustion type. The engine 12 includes a drive shaft 13 disposed transversely with respect to the body 11. Arranged on the body 11 is a cylindrical stator 14 having bearings 15 arranged diametrically opposite each other and in which the opposite ends of the drive shaft 13 are respectively journaled for rotation. An upper rotor or ring 16 rotatable on the stator 14 carries upper wings 17 which are arranged diametrically opposite each other, and each wing 17 is mounted for rotation on the rotor or ring 16 in any suitable manner. In the present instance each wing 17 has an arbor or trunnion 18 journaled in a bearing 19 embodied by the rotor or ring 16. The rotor or ring 16 rotates in contact with anti-friction rollers 20 on the stator 14, and also on an annular shoulder 21 on said stator. A lower rotor or ring 22 rotatable on the stator 14 carries wings 23 which are arranged diametrically opposite each other, and each of which is provided with an arbor or trunnion 24 journaled in a bearing 25 embodied by the rotor or ring 22. The rotor or ring 22 rotates in contact with anti-friction rollers 26 on the stator 14 and also on an annular shoulder 27 on said stator.

In order to rotate the rotors or rings 16 and 22 in response to the rotation of the drive shaft 13, the latter is provided with a beveled pinion 28 which meshes with beveled gears 29 respectively secured to the rotors or rings 16 and 22. It will therefore be understood that the rotors 16 and 22 rotate relatively in opposite directions.

The wings 17 and 23 may be of any preferred construction, and in the present instance each wing in cross section has an upper convex surface and a substantially flat lower surface. The wings 17 are disposed reversely with respect to each other so that the leading edges thereof will be presented to the air as the rotor 16 which carries them rotates in a counter-clockwise direction. The wings 23 are also arranged reversely with respect to each other so that the leading edges thereof will be presented to the air as the rotor 22 which carries them rotates in a clockwise direction. It is also to be observed that each pair of wings 17 and 23 at each side of the axis of the stator 14 are reversely arranged with respect to each other, so that one of the wings, the upper wing 17 for instance produces the lifting action, the other wing 23 below it produces a thrust or propelling action.

The angular disposition of each of the wings 17 is changed during each rotation about the axis of the stator 14, in order that each wing will act alternately as a lifting wing and as a propelling or thrusting wing. In accordance with this feature of the invention, the arbor or trunnion of each wing is provided with a toothed segment 30 which meshes with a toothed rack 31 having guided movement by portions of the related rotor. The lower end of the rack 31 has a roller 32 which is disposed to travel in a groove 33 the upper and lower surfaces of which present up-throw and down-throw cams 34 and 35 respectively. The provision and arrangement is such that just before the longitudinal axes of the pairs of wings 17 and 23 pass the longitudinal axis of the body 11, the rollers 32 are acted upon by the cams 34 and 35 and thereby reverse the angular positions of the wings so that the lift wings become thrust wings and vice versa. It will therefore be understood that the wings not only revolve around the axis of the stator 14 but also are caused to oscillate. The combined action of the wings may be aptly termed a rowing action, or one simulating a rowing action. The revolving and oscillating wings constitute a means for simultaneously suspending and propelling the craft. It is to be observed that the pair of wings 17 extending laterally from the rotor 16 are directly above the wings 23 extending laterally from the rotor 22. The angular position or angle of incidence of the wings of each pair changes simultaneously when the wings are substantially parallel to the longitudinal axis of the body 11, and it will therefore be understood that one wing of each pair travels forwardly one-half of a revolution to generate lift, while the other wing of each pair travels one-half of a revolution in a reverse angular position of incidence to generate a forward thrust and at the same time generating a certain amount of lift, in each complete revolution of the related rotor. Each wing is not only moved to the angular position by the related segment 30 and rack 31 but is also held in the angular position during its travel. One of the upper wings 17 and one of the lower wings 23 are traveling forwardly while the other wings are traveling rearwardly, and in this way a gyroscopic action is generated which keeps the craft properly balanced and steady while in flight. It is to be understood that the velocity of the wings will be sufficiently great with respect to the velocity of the air stream as to produce an effectual dynamic reaction to sustain the craft and to impart thereto translatory movement. This will be accomplished with a minimum of resistance due to the fact that at times each wing is moving with the air stream yet fast enough to generate a forward thrust. It is to be understood that each of the wings may be adjusted to move within the range from zero-angle to an angle of incidence of any preferred degree.

It is to be understood that the invention is not restricted to the precise arrangement of parts shown and described, as details of construction may be modified and rearranged without departing from the spirit of the invention, the scope of which is limited only by the terms of the appended claims.

I claim:

1. The combination in a craft of the class set forth, of a supporting body, a stator on said body, upper and lower rotors on said stator, each rotor having wings extending laterally therefrom and disposed diametrically opposite each other, each wing being turnable on its own axis, means to rotate said rotors in opposite directions to cause the wings on one rotor to revolve opposite to those on the other rotor, and means to impart turning movement to each wing on its own axis, to change the angle of incidence thereof, twice during each revolution of the related rotor.

2. The invention defined in claim 1, in which one wing of the upper pair travels counter-clockwise at one side of said stator while one wing of the lower pair travels clockwise at the opposite side of said stator, and while the other wing of the upper pair travels counter-clockwise at one side of said stator, while the other wing of the lower pair travels clockwise at the opposite side of said stator, the angles of incidence of the wings of each pair being relatively reversed.

WESTINUS BOER.